(No Model.) 2 Sheets—Sheet 1.
J. BEATTIE, Jr.
ELECTRIC BATTERY.
No. 346,528. Patented Aug. 3, 1886.
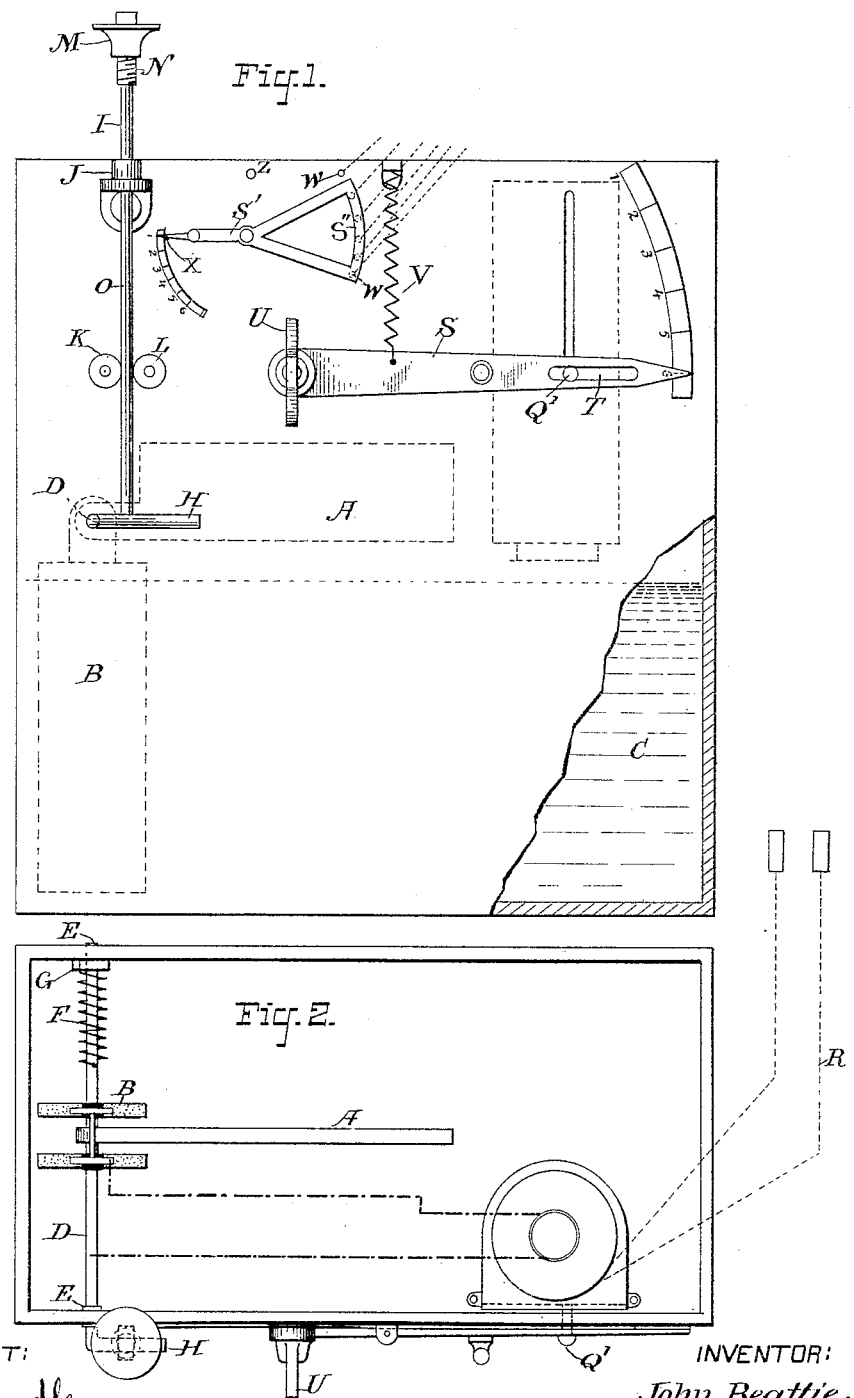

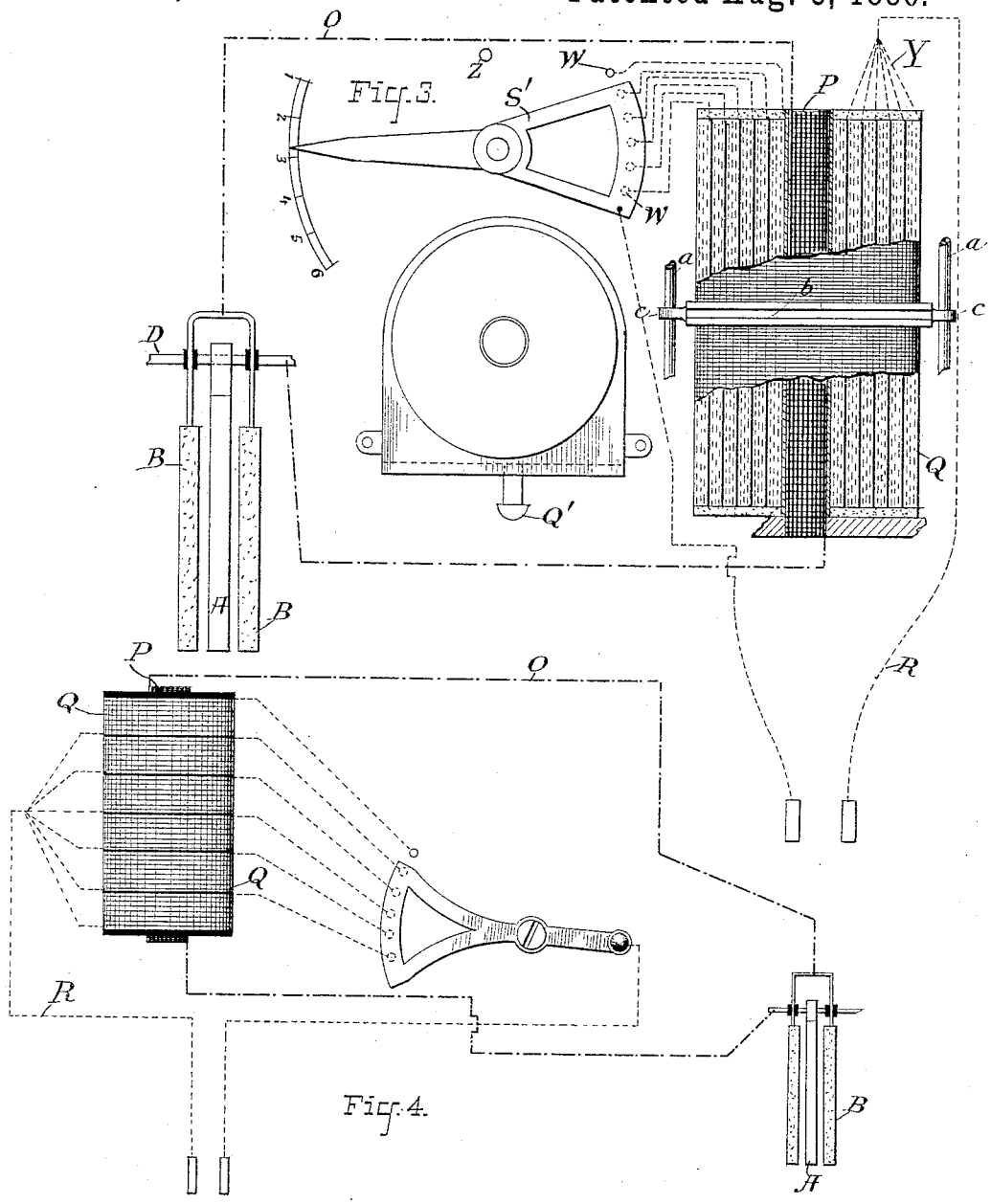

UNITED STATES PATENT OFFICE.

JOHN BEATTIE, JR., OF WESTPORT, MASSACHUSETTS.

ELECTRIC BATTERY.

SPECIFICATION forming part of Letters Patent No. 346,528, dated August 3, 1886.

Application filed March 18, 1886. Serial No. 195,648. (No model.)

*To all whom it may concern:*

Be it known that I, JOHN BEATTIE, Jr., a citizen of the United States, and a resident of Westport, in the county of Bristol and State of Massachusetts, have invented certain new and useful Improvements in Electric Batteries, of which the following is a complete, clear, and exact description, setting forth in general and in detail my invention.

My invention relates to batteries employed for medical purposes, and particularly to the mechanical construction whereby the object is accomplished, whereby the circuit may be easily cut out and the zinc or other electrode simultaneously removed from the electrolyte, and whereby the strength of current may be regulated to accommodate the pleasure of the patient.

In order to illustrate the practical manner of carrying out the invention, and to enable others to construct and use the same, drawings are hereunto annexed and described, in which similar characters of reference represent corresponding elements.

Figure 1 is a general outside side view with a portion of the casing or cell broken away. Fig. 2 is a general top view. Fig. 3 is a view showing the electrical connections, the induction-coils being partly in cross-section; and Fig. 4 shows a modification.

The battery and its appendages consist specifically of the combination of a zinc or other metallic electrode, A, two carbon electrodes, B, an electrolyte, C, composed of any suitable chemicals—as, for instance, potassic bichromate—a shaft, D, fixed to said zinc electrode and adapted to rotate in the bearing E, a coil-spring, F, upon said shaft and fixed to the same at one end, the other end of the spring being fixed to the casing at G, and the spring being under considerable tension when the zinc is horizontal, as shown in Fig. 2, and under a stronger tension when the zinc is hanging downward, as in Fig. 3, so that the force of the spring in unwinding will raise the zinc to the horizontal position and retain itself without the electrolyte, a projection, H, to said shaft, whereby the shaft may be rotated, a rod, I, resting against said projection and passing through a collar, J, provided with an internal screw-thread, and between two rollers, K and L, which assist in preventing lateral motion and friction, and a nut, M, rotatable upon the rod I, and having an external screw-thread, N, adapted to fit into said internal screw-thread, so as to hold the zinc electrode in the electrolyte against the force of the said coil-spring.

The apparatus consists, further, of the combination of a primary circuit, O, a primary coil, P, therein, one or more secondary coils, Q, in a secondary circuit, R, a pin, Q', fixed to said secondary coils, which are movable longitudinally or along the said primary coils, a lever or index-hand, S, on the outside of the casing and having a slot, T, which fits loosely upon said pin, a thumb-screw, U, or other fastening-clamp by which the lever may be fixed in any suitable position, a retractile spring, V, strong enough to raise the lever and secondary coils when the screw is loosened, and a scale opposite said lever or index-hand, and divided into any number of divisions, 1 2 3 4 5 6, the number indicating different positions of the secondary coils relatively to the primary coils. The secondary coils are mounted in a suitable ring-frame. (Shown in top view in Fig. 3.) In Fig. 3 it is also shown in side view on that part of the secondary coils not in cross-section. The frame or ring is that portion to which the pin Q' is attached, and it fits tightly upon the secondary coils. This ring has a projection containing a hole upon each side, and through the holes pass the rods shown, the one at the right and the other at the left of the secondary coils Q. As the part S is moved up and down it is evident that the pin Q' carries the secondary coils Q up and down. The said rods are indicated by $a$, the said frame by $b$, and the said projections thereto by $c$.

There is provided, further, apparatus consisting of the combination of a lever or switch, S', having a contact-plate at one end pressing upon contact-points W, which are the terminals of the secondary coils Q, and at the other end a pointer, X, adapted to move along a scale divided into as many divisions, 1 2 3 4 5 6, as there are secondary coils, said lever being connected electrically with the opposite terminals, Y, when the handles are in closed circuit.

The battery is intended to be used by those who may be ignorant of the principles of electrical science, and yet who are often obliged to take electricity for their health when alone. I provide therefore a battery such as has been described, and which operates as follows: By moving the lever S upward or downward the secondary coils are variably influenced by the primary coils, while by similar motions of the lever S' a variable number of secondary coils, Q, may be thrown into circuit. A little practice enables the patient to obtain a current of a strength recommended by his physician.

The manner in which the zinc is operated consists in pushing downward the rod I and retaining the same in its lowest position by screwing the nut M into the collar J. By releasing the said screw and letting go of the rod the zinc flies upward into a horizontal position by the action of the force of the coil-spring.

The invention is not limited to the precise construction hereinbefore described, as it is evident that many modifications may be made therein without departing from the spirit of the invention.

In Fig. 4 the disposition of the secondary coils consists in placing them side by side, instead of in layers. Whether the coils are placed in the one manner or the other the operation is substantially the same.

A stop, Z, is provided in such a position that the lever or switch S' is always in circuit at least with one secondary coil.

Having now stated the title, object, and nature of the said invention, having described its practical realization by reference to the accompanying drawings, and having particularly ascertained the manner in which the same operates to accomplish the said object, what I consider to be novel and original and therefore claim as my invention secured to me by the hereinbefore in part recited application for Letters Patent of the United States, is—

In an electro-medical battery, a primary circuit, a primary coil therein, a secondary circuit, one or more secondary coils in said secondary circuit and longitudinally movable over said primary coil, an adjustable switch in circuit with one or more of said scondary coils, a pointer or index-hand upon the handle of said switch and a scale opposite said pointer, a pin projecting from said secondary coils, a second index-hand and scale therefor, a retractile spring attached to said hand, a fastening device or clamp attached to said hand, a slot in said hand fitting loosely over said pin, and means consisting of a stop-pin near said first index-hand to prevent cutting out all of the secondary coils, all combined as and for the purpose described.

In testimony whereof I have hereunto signed my name in the presence of two subscribing witnesses this 16th day of March, 1886.

JOHN BEATTIE, Jr.

Witnesses:
LEMUEL D. ADAMS,
LUTHER M. DAYTON.